Figure 1:
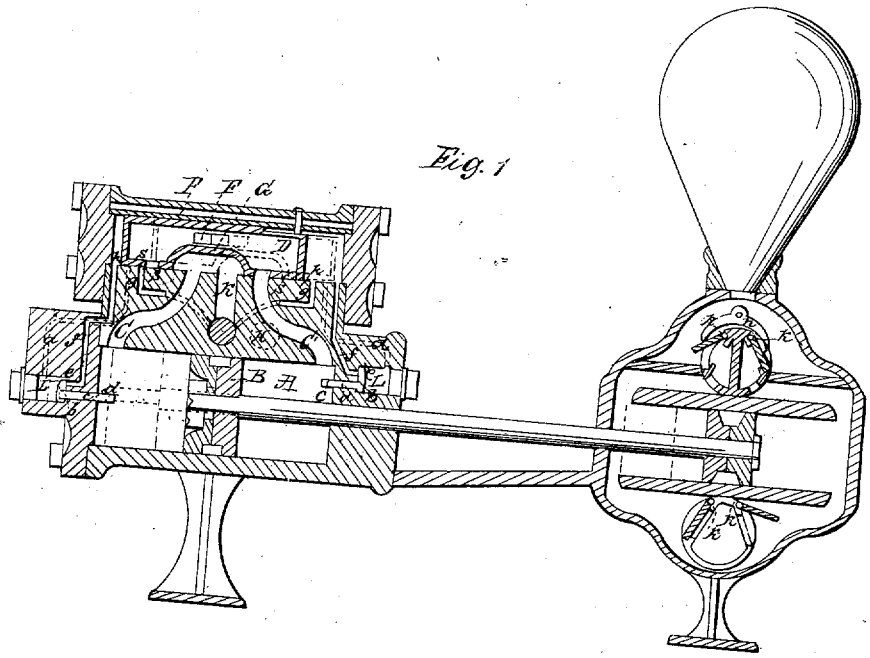

L. C. Rodier,
Steam Slide Valve.

No. 2,530.

Reissued Mar. 26, 1867.

Witnesses;
Edward St. Hyde
J. Lobdell

Inventor;
Louis C. Rodier
by his Attorney
J. B. Fardiner

N. PETERS, PHOTO-LITHOGRAPHER, WASHINGTON, D. C.

United States Patent Office.

LOUIS C. RODIER AND J. B. GARDINER, OF SPRINGFIELD, MASSACHUSETTS, ASSIGNEES OF LOUIS C. RODIER.

*Letters Patent No.* 57,188, *dated August* 14, 1866; *reissue No.* 2,530, *dated March* 26, 1867.

IMPROVEMENT IN STEAM PUMPS.

The Schedule referred to in these Letters Patent and making part of the same.

TO ALL WHOM IT MAY CONCERN:

Be it known that I, LOUIS C. RODIER, of Springfield, Hampden county, Commonwealth of Massachusetts, have invented certain new and useful improvements in "Steam Pumps;" and I do hereby declare that the following is a full and exact description thereof, reference being had to the accompanying drawings, and to the letters of reference marked thereon.

My improvements relate to the kind of pumping engine known as direct and double-acting, consisting of a steam engine, the piston-rod of which is continued outward and enters the water cylinder of a pump attached to the same bed with the steam cylinder, the piston of the pump being attached to the opposite end of this piston-rod from the steam piston. It has been customary in such pumping engines to use a tappet arm attached to the piston-rod between the two cylinders for the purpose of operating the steam valves, but this engine is so arranged that no tappet arm or other outside connection between the working parts and the valve is used. By this arrangement I do away with all complicated mechanism generally used to operate the steam valve, and also am able to place the engine and pump nearer together on the bed, making a lighter and more compact machine, and one that is necessarily stronger and more durable, from the fact that the cylinders are so much nearer together that there is no chance for spring or breakage in the bed between the cylinders, and the piston-rod being shorter and unencumbered by additional weight is not so easily sprung out of line. These improvements relate both to the engine and pump, and consist of, in the engines, a peculiar and advantageous arrangement of steam ports and reservoirs in connection with the main valve and two smaller valves situated at or near the end of the stroke of the steam-piston, the manner and purpose of which arrangement is more fully shown hereafter, and in the pump a peculiar and compact arrangement of the water valves. In the drawings accompanying these specifications—

Figure 1 is a side view of my improved steam pump.

Figure 2:
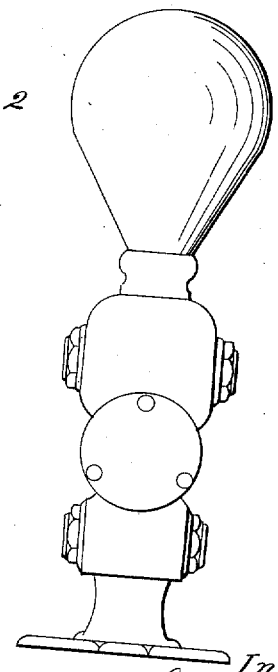

Figure 2, an end view of the same, looking at the pump; and

Figure 3:
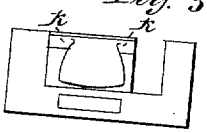
Figure 4:
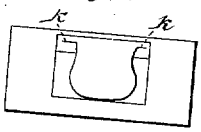

Figures 3 and 4 are side views of the upper and lower valve-plugs of the pump respectively.

I will first describe the construction of the engine. A is the cylinder in which the piston B works, steam being let on at the two ends through the ports C C′ and received into these ports from the interior of the hollow cylindrical slide-valve D, into which the steam is taken from the jacket E in the valve-chest. Around this valve, through the opening F, is the valve which communicates with the jacket by means of a similar opening, G, in its side, the jacket receiving steam from the boiler through the pipe H. After being used in the cylinder, the steam is exhausted through the ports C C′, passing out into the exhaust K through the valve, which, acting like an ordinary slide valve, forms a connection with these ports C or C′, and the exhaust port to let off the steam as before it had formed a connection between the live-steam pipe and the same port C or C′.

It will be seen from the above description that the arrangement and operation of the main steam ports and valve is like that of an ordinary slide valve, excepting that steam is let into the interior of the hollow valve, which is cylindrical, instead of on the top of a flat slide.

In the arrangement of secondary steam reservoirs, ports, and valves, for operating the main valve D, consist my improvements in the engine. This I will now describe: In each end of the cylinder I form a cavity, L, which acts as a reservoir for the steam received from the jacket E before mentioned through the port *a*. In this cavity, and nearly filling it diametrically, I place a small valve, *b*, communicating with the interior of the steam cylinder by means of the stem *c* working through a steam-tight opening, *d*. This valve has a small opening, *e*, cut in it to allow the passage of the steam by it. From this reservoir the port *f* runs, leading into the valve-chest, and from the valve-chest the small exhaust port *g* runs, communicating with the main exhaust K, so that the main valve forms a piston working in its cylinder, which is the valve-chest, and operated precisely like the main piston by alternately letting in and exhausting steam at either end of this piston valve.

The operation of this engine is as follows: The piston and valve being in the position shown in fig. 1, steam being let on goes into the interior of the main valve D and passes out through the port C into the cylinder, driving the piston to the opposite end of the cylinder. When it (the piston) arrives at the opposite end of the cylinder it strikes the stem *c* of the valve *d*, forcing it open and allowing live steam from the reservoir to pass over the valve through the cut *e* and up through the port *f* into the interior of the valve-chest. This starts the main valve D, which immediately travels to the opposite end of the valve-chest, bringing it to the position shown at fig. 1 in red lines, and allows the steam to pass from the interior of the valve D into the opposite end of the cylinder, from which it has before entered; and, also, this motion of the valve uncovers the opening of the port *g*, where it enters the valve-chest, thus allowing the steam which has propelled the valve D to escape. This operation reverses the motion of the piston, causing it to return to its original position, and as it starts to return the pressure in the reservoir on the small valve *g*, closes it. Arriving at the opposite end, it acts on the small valve *g*, at that end, causing the other part to operate in a similar manner to that described, reversing its motion again; and these operations are repeated alternately at each end of the cylinder, causing a continuous reciprocating motion of the piston.

I will now describe my improvements in the pump. This pump is double-acting, and has two hinged valves communicating with the suction pipe and two similar valves communicating with the delivery pipe. Each pair of these valves, or each one singly, is placed in a plug or cylinder, which is inserted in an opening made for the purpose in the pump and fastened there in any desired manner, the object being in such arrangement to place the valve so that they may be readily removed and examined.

The advantages I claim for this pumping engine, considered as a whole and arising from the various improvements here described, united and used in connection with each other, are: Perfect surety of operation; as it (the piston) moves to the end of the cylinder it must operate the small valve, thus moving the main valve by letting on steam to it and reversing its own motion, no dependence being placed from outside and complicated mechanism. Compactness and the small number of parts, and consequently cheapness of construction. The arrangement of the valves in the water cylinder, which are easily removed for examination or change. When these valves are hung upon a plug in pairs the arrangement of the lower plug consists merely of a single cavity communicating with the suction pipe, and having an opening on each side, which the valves alternately uncover and close, allowing the water to flow into either end of the cylinder as the piston is moved, and preventing it from being forced out at the other end in the manner of ordinary valves in similar situations. The upper plug is formed into three apartments by a longitudinal and a lateral partition, so that the water when forced may not flow through the opposite valve back into the cylinder, but may have free passage out into the delivery pipe or up into the air-chamber.

Now, having described my invention, what I claim as new, and desire to secure by Letters Patent, is—

1. The arrangement of secondary valves *d d'*, ports *f f*, and reservoirs L L, at or near each end of the cylinder, operating with the piston B and valve D, to reverse the motion of the piston in the manner set forth.

2. The arrangement of the water valves of the pump, consisting of hinge valves hung singly or in pairs upon plugs constructed as described.

3. Constructing the plug through which the water is forced when both valves are attached to it in the manner shown, having a longitudinal and a lateral partition, arranged substantially as set forth.

LOUIS C. RODIER,
J. B. GARDINER.

Witnesses:
R. F. HYDE,
J. R. SMITH.